June 3, 1924.
L. KOOPERSTEIN
DISPENSING VALVE
Original Filed Feb. 20, 1920
1,496,549
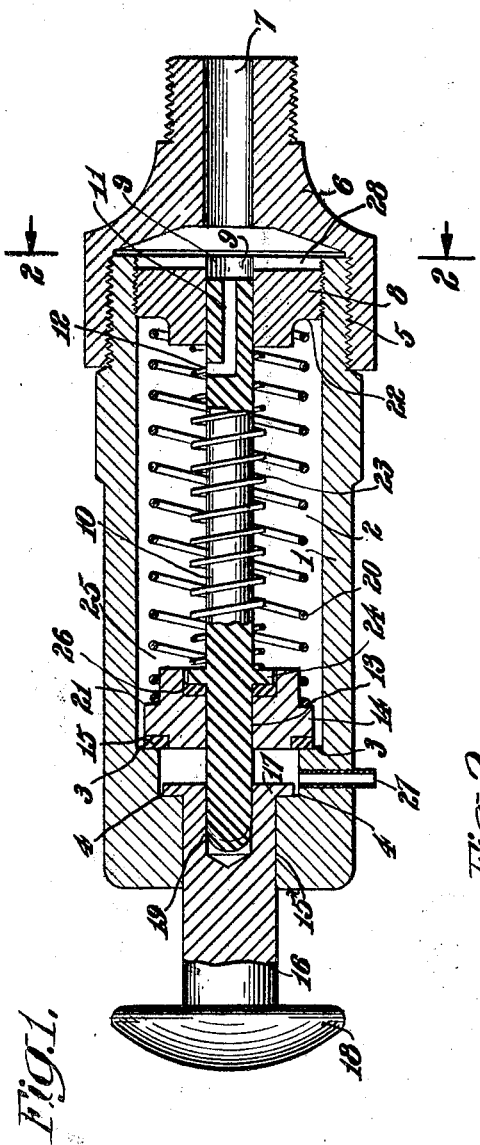
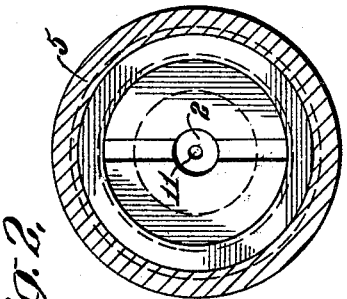
Inventor
Louis Kooperstein
By his Attorney
H. Lee Helms

Patented June 3, 1924.  1,496,549

UNITED STATES PATENT OFFICE.

LOUIS KOOPERSTEIN, OF NEW YORK, N. Y., ASSIGNOR TO WEST DISINFECTING COMPANY, OF NEW YORK, N. Y., A CORPORATION OF NEW YORK.

DISPENSING VALVE.

Application filed February 20, 1920, Serial No. 360,146. Renewed November 30, 1923.

*To all whom it may concern:*

Be it known that I, LOUIS KOOPERSTEIN, a citizen of the United States, residing at New York, county and State of New York, have invented certain new and useful Improvements in Dispensing Valves, of which the following is a full, clear, and exact specification.

The invention relates more particularly to that class of valves operated by a push-rod or plunger to dispense a measured quantity of liquid, such as soap, the liquid passing into the valve by gravity from a container. In valves of this type an operative movement of the plunger serves generally to permit the flow of liquid from the valve chamber to a point exterior to the valve, and to close the valve inlet leading to the main supply of liquid. In the present improvements means are provided for shutting off the supply of liquid to the valve prior to the operation of the means for causing the flow of liquid from the valve, so that the operating plunger may not be moved to a position in which liquid will be permitted to flow through the valve directly from the main supply; a further improvement consists in the particular arrangement of the means for permitting the flow of liquid into the valve and for shutting off the said flow; and a further improvement resides in a form of the valve-operating plunger and its connections.

The invention will be understood by reference to the accompanying drawing, in which Fig. 1 illustrates an embodiment of the invention in enlarged longitudinal cross-section; and Fig. 2 is a transverse cross-section on the line 2—2, Fig. 1.

The embodiment of the invention illustrated in the drawing comprises a cylindrical body 1 formed with the inner chamber 2. the latter being reduced in size at its lower end to provide the annular flanges or shoulders 3 and 4 for a purpose hereinafter set forth. The valve body 1 at its upper end is provided with threads 5 by means of which it may be directly connected to a conduit leading from the source of supply for the liquid to be dispensed. In the present instance the valve body is threaded at 5 to a cap 6 provided with a longitudinal aperture 7 for the passage of the liquid, from a suitable container. Threaded within the upper end of the valve body is a disk 8 formed with a central aperture 9 to receive the upper end of a valve rod 10, the latter being provided at its upper end with an axially-disposed aperture 11 communicating with a duct 12, the aperture and duct providing a passageway through which the liquid may flow into the chamber 2.

At its lower end the valve rod passes through an aperture 13 formed in a piston 14; the latter normally being supported upon shoulder 3 of the valve body. Piston 14 is provided in its lower face with a packing or washer 15 which serves to prevent the passage of liquid from chamber 2 when the piston is seated. The valve body is provided in its lower end with centrally-disposed aperture 15 through which passes a plunger 16 formed with a flange 17 adapted to rest upon shoulder 4 within that portion of chamber 2 below piston 14, and at its outer end formed with the head or push-button 18. Plunger 16 is formed with a longitudinal aperture 19 to receive the lower end of the valve rod 10.

The piston is normally maintained in abutment with shoulder 3 of the valve body by means of a spring 20 which at one end engages an annular shoulder 21 formed on the piston, and which engages at its opposite end an annular shoulder 22 formed on the disk 8. The valve rod 10 is normally maintained in position to permit the flow of liquid into the valve chamber 2, by means of a spring 23, one end of this spring engaging a collar 24 on the valve rod and the opposite end of the spring engaging the lower face of the disk 8. Collar 24 is received within a recess 25 formed within the upper face of plunger 14, and packing 26 is preferably disposed in the said recess back of the collar.

In the operation of the device, inward movement of plunger 18 will first impart an endwise movement to valve rod 10, the said movement continuing until duct 12 is closed by the wall of aperture 9 in disk 8, thereby shutting off the passage of liquid into the chamber 2. At this point the inner face of the plunger will come into contact with piston 14 and the latter will be moved inwardly against the tension of spring 20, thereby permitting the flow of liquid from chamber 2 below the piston and through the discharge duct 27. Upon the release of plunger 16, piston 14 will be returned to its initial position by the action of spring 20 prior to the movement of the valve rod into position to permit the passage of liquid from the source of supply into the valve chamber.

It will be seen that throughout the movement of valve rod 10 it is maintained in alignment by the walls of aperture 9 in disk 8 and by the walls of aperture 19 in plunger 16. Also, the connection between the valve rod and the plunger is such that if the latter is carelessly rotated, such rotation will have no effect upon the rod. By providing means for closing the inlet to chamber 2 prior to that movement of the piston 14 which opens the chamber to the discharge duct 27, the supply of liquid may safely be fed to the valve under substantial pressure, inasmuch as it is impossible to move the valve parts into such position as to cause a flow of liquid through the valve discharge duct directly from the source of supply. Inasmuch as the disk 8 is threaded within the valve body it may be adjusted to reduce or increase the time of closing the valve inlet relatively to the opening of the discharge duct. The disk is provided with a transverse slot 28 to receive a tool for its ready rotation.

Having described my improvements, what I claim is:

In a dispensing valve, in combination, a chamber provided with an inlet and an outlet for fluid, a closure for the outlet and formed with an axial opening, a rod movable through said opening in the closure to open and close the inlet, concentric springs, one acting upon the closure and one upon the rod to hold the same in retracted position, and a plunger adapted to actuate the rod and closure in succession.

Signed at New York city, in the county of New York and State of New York this 19th day of February, A. D. 1920.

LOUIS KOOPERSTEIN.